(12) United States Patent
Sano

(10) Patent No.: US 9,912,887 B2
(45) Date of Patent: Mar. 6, 2018

(54) IMAGE READING APPARATUS AND SEMICONDUCTOR DEVICE

(71) Applicant: SEIKO EPSON CORPORATION, Tokyo (JP)

(72) Inventor: Takafumi Sano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/366,092

(22) Filed: Dec. 1, 2016

(65) Prior Publication Data

US 2017/0171478 A1 Jun. 15, 2017

(30) Foreign Application Priority Data

Dec. 14, 2015 (JP) ................. 2015-243161

(51) Int. Cl.
*H04N 1/04* (2006.01)
*H04N 5/355* (2011.01)
*H04N 1/031* (2006.01)
*H04N 5/3745* (2011.01)

(52) U.S. Cl.
CPC ............ *H04N 5/3559* (2013.01); *H04N 1/031* (2013.01); *H04N 5/37457* (2013.01); *H04N 2201/0081* (2013.01)

(58) Field of Classification Search
CPC ............. H04N 5/35509; H04N 5/3577; H04N 5/3591; H04N 5/3592; H04N 5/363; H04N 5/3653; H04N 5/369; H04N 5/3694; H04N 5/3698; H04N 5/372; H04N 5/374; H04N 5/3765; G06K 9/0002; G06K 2009/00932

USPC .......... 358/475, 509, 474; 235/454, 462.25; 382/124

See application file for complete search history.

(56) References Cited

U.S. PATENT DOCUMENTS

| 5,322,994 | A | 6/1994 | Uno | |
|---|---|---|---|---|
| 7,030,922 | B2 * | 4/2006 | Sakuragi | H04N 5/3653 250/208.1 |
| 7,075,311 | B1 * | 7/2006 | Oshiro | G01R 31/1272 324/557 |
| 7,145,600 | B2 * | 12/2006 | Hashimoto | H01L 27/14818 257/E27.156 |

(Continued)

FOREIGN PATENT DOCUMENTS

| JP | 05-207375 A | 8/1993 |
|---|---|---|
| JP | 2007-013756 A | 1/2007 |

*Primary Examiner* — Negussie Worku
(74) *Attorney, Agent, or Firm* — Global IP Counselors, LLP

(57) ABSTRACT

An image reading apparatus for reading an image includes a light receiving element that receives light from the image so as to perform photoelectric conversion, an amplifier which is electrically connected to the light receiving element, and amplifies a signal generated by photoelectric conversion, a switch element which is electrically connected to both ends of the amplifier so as to be parallel to the amplifier, a first capacitance which are electrically connected to both ends of the amplifier so as to be parallel to the amplifier, and a second capacitance which has one end which is electrically connected to one end of the light receiving element and one end of the amplifier. A second signal of which potential is changed after potential of a first signal input to a control terminal of the switch element is changed is applied to another end of the second capacitance.

7 Claims, 12 Drawing Sheets

(56) References Cited

U.S. PATENT DOCUMENTS

| | | | |
|---|---|---|---|
| 7,692,702 B2 | 4/2010 | Sano | |
| 8,717,306 B2* | 5/2014 | Choi | G06F 3/0412 |
| | | | 345/173 |
| 8,797,306 B2* | 8/2014 | Gotoh | G06F 3/0412 |
| | | | 345/175 |
| 9,362,896 B2* | 6/2016 | Suzuki | B41J 29/393 |
| 2016/0167371 A1* | 6/2016 | Sano | B41J 2/14233 |
| | | | 347/68 |
| 2016/0221333 A1* | 8/2016 | Sano | B41J 2/04541 |
| 2017/0171419 A1* | 6/2017 | Sano | H04N 1/02835 |
| 2017/0171478 A1* | 6/2017 | Sano | H04N 1/031 |

* cited by examiner

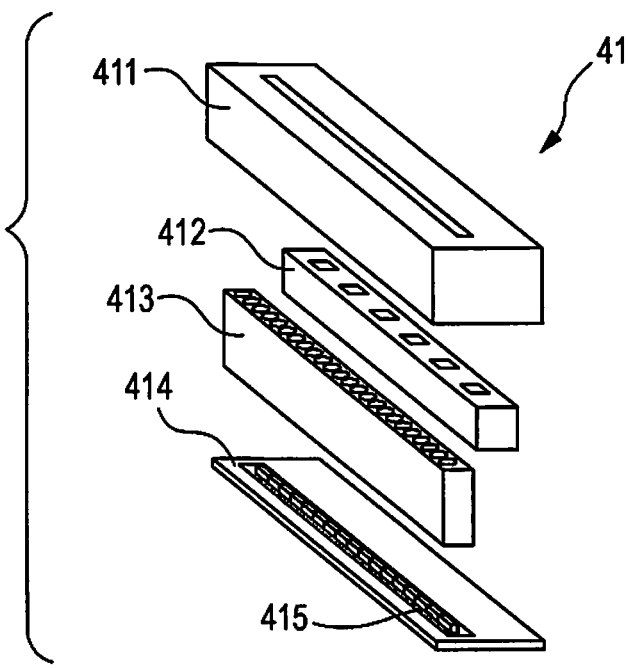
FIG. 3
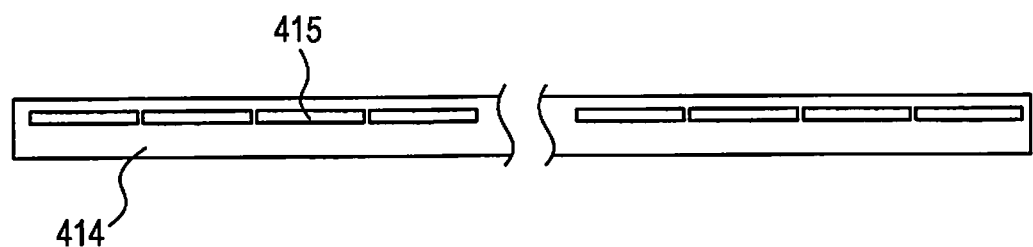
FIG. 4
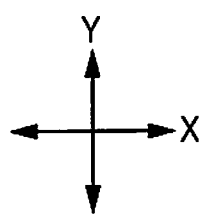

IMAGE READING APPARATUS AND SEMICONDUCTOR DEVICE

The entire disclosure of Japanese Patent Application No. 2015-243161, filed Dec. 14, 2015 is expressly incorporated by reference herein.

BACKGROUND

1. Technical Field

The present invention relates to an image reading apparatus and a semiconductor device.

2. Related Art

An image reading apparatus (scanner) using a contact image sensor, and a copying machine, a combined printer, or the like to which a printing function is added have been developed. As the contact image sensor used in the image reading apparatus, a configuration of using a photodiode which is provided on a semiconductor substrate is used.

For example, JP-A-5-207375 discloses a solid-state imaging element (imaging sensor) including a pixel (basic cell). The pixel includes a photodiode, a feedback capacitance element which accumulates photoelectric charges generated in the photodiode, an amplification circuit which uses an n-type MOS transistor, and a reset switching element for disconnecting an input terminal and an output terminal of the amplification circuit (source and drain of the n-type MOS transistor).

JP-A-5-207375 discloses that a capacitance value of the feedback capacitance element is decreased, and thus it is possible to improve sensitivity of a pixel. However, in the pixel (basic cell) disclosed in JP-A-5-207375, if the capacitance value of the feedback capacitance element is set to be small, a dynamic range of an output signal from the pixel (basic cell) is narrowed due to charge injection. Thus, in the image reading apparatus (scanner) of the related art, it is difficult to improve sensitivity in reading an image.

SUMMARY

An advantage of some aspects of the invention is to provide an image reading apparatus which can read an image with high sensitivity. Another advantage of some aspects of the invention is to provide a semiconductor device which can reduce an occurrence of narrowing the dynamic range of an output signal.

The invention can be realized in the following aspects or application examples.

APPLICATION EXAMPLE 1

According to this application example, there is provided an image reading apparatus for reading an image. The image reading apparatus includes a light receiving element that receives light from the image so as to perform photoelectric conversion, an amplifier which is electrically connected to the light receiving element, and amplifies a signal generated by photoelectric conversion, a switch element which is electrically connected to both ends of the amplifier so as to be parallel to the amplifier, a first capacitance which is electrically connected to both ends of the amplifier so as to be parallel to the amplifier, and a second capacitance which has one end which is electrically connected to one end of the light receiving element and one end of the amplifier. A second signal of which potential is changed after potential of a first signal input to a control terminal of the switch element is changed is applied to another end of the second capacitance.

In the image reading apparatus according to the application example, at least some of charges accumulated in parasitic capacitance of the switch element in a state where both ends of the switch element are disconnected by the first signal are cancelled with charges accumulated in the second capacitance by the second signal in a state where potential of the first signal is changed, and thus both ends of the switch element are opened. Thus, it is possible to reduce an occurrence of narrowing a dynamic range of an output signal of the amplifier due to charge injection. Accordingly, according to the image reading apparatus of the application example, it is possible to ensure a sufficient dynamic range of the output signal of the amplifier, and thus it is possible to read an image with high sensitivity.

APPLICATION EXAMPLE 2

In the image reading apparatus according to the application example, the second signal may be a signal obtained by reversing a polarity of the first signal.

According to the image reading apparatus of the application example, the second signal is obtained by reversing a polarity of the first signal which is used for controlling the switch element. Thus, it is possible to reduce an occurrence of narrowing a dynamic range of an output signal of the amplifier due to charge injection, without a little increase of a circuit size.

APPLICATION EXAMPLE 3

In the image reading apparatus according to the application example, the second capacitance may be capacitance between a first wire for electrically connecting one end of the light receiving element, one end of the amplifier, one end of the switch element, and one end of the first capacitance, and a second wire on which the second signal is propagated.

According to the image reading apparatus of the application example, the second capacitance is realized by interconnect capacitance, and thus does not generate a leakage current, like MOS capacitance. Accordingly, deterioration of image quality or an occurrence of image defects is difficult.

APPLICATION EXAMPLE 4

In the image reading apparatus according to the application example, the first wire and the second wire may be provided in the same wiring layer among a plurality of wiring layers provided on a semiconductor substrate.

According to the image reading apparatus of the application example, the second capacitance is configured by the first wire and the second wire provided in the same wiring layer, and thus can be realized in a process included in a general manufacturing process. Thus, an additional process is not required, and an increase of cost is not required.

According to the image reading apparatus of the application example, the second capacitance may be disposed in a wiring layer higher than a layer in which various elements such as a MOS transistor and a resistor are formed, so as to overlap a region in which the element is formed. Thus, it is also effective in reducing a size of the circuit.

APPLICATION EXAMPLE 5

In the image reading apparatus according to the application example, the first wire may have a first comb-tooth shaped portion. The second wire may have a second comb-tooth shaped portion. First comb-tooth shaped portions and second comb-tooth shaped portions may be provided so as to mesh with each other. The second capacitance may be capacitance between the first comb-tooth shaped portion and the second comb-tooth shaped portion.

According to the image reading apparatus of the application example, an area of potions at which the first comb-tooth shaped portions and the second comb-tooth shaped portions face each other is increased. Thus, it is possible to realize the second capacitance having a desired capacitance value, with a small area.

According to the image reading apparatus of the application example, it is possible to realize the second capacitance with a small area, and thus it is possible to easily perform disposition so as to overlap a region in which various elements are formed. In addition, it is very effective in reducing a size of the circuit.

APPLICATION EXAMPLE 6

In the image reading apparatus according to the application example, a value of the second capacitance may be equal to parasitic capacitance between the control terminal and a terminal of the switch element, which is connected to the one end of the second capacitance.

"The value of the second capacitance being equal to parasitic capacitance" includes a case where the value of the second capacitance has a margin for the value of the parasitic capacitance, which is caused by a manufacturing error and the like of the switch element or the second capacitance, in addition to a case where the value of the second capacitance accurately coincides with the value of the parasitic capacitance.

In the image reading apparatus according to the application example, charges accumulated in parasitic capacitance of the switch element in a state where both ends of the switch element are disconnected by the first signal are substantially completely cancelled with charges accumulated in the second capacitance by the second signal in a state where potential of the first signal is changed, and thus both ends of the switch element are opened. Thus, according to the image reading apparatus of the application example, narrowing the dynamic range of the output signal of the amplifier due to charge injection hardly occurs, and it is possible to ensure a wide dynamic range. Thus, it is possible to read an image with high sensitivity.

APPLICATION EXAMPLE 7

According to this application example, there is provided a semiconductor device which includes a light receiving element that receives light so as to perform photoelectric conversion, an amplifier which is electrically connected to the light receiving element, and amplifies a signal generated by photoelectric conversion, a switch element which is electrically connected to both ends of the amplifier so as to be parallel to the amplifier, a first capacitance which is electrically connected to both ends of the amplifier so as to be parallel to the amplifier, and a second capacitance which has one end which is electrically connected to one end of the light receiving element and one end of the amplifier. A second signal of which potential is changed after potential of a first signal input to a control terminal of the switch element is changed is applied to another end of the second capacitance.

In the semiconductor device according to the application example, at least some of charges accumulated in parasitic capacitance of the switch element in a state where both ends of the switch element are disconnected by the first signal are cancelled with charges accumulated in the second capacitance by the second signal in a state where potential of the first signal is changed, and thus both ends of the switch element are opened. Thus, according to the semiconductor device of the application example, it is possible to reduce the occurrence of narrowing a dynamic range of an output signal of the amplifier due to charge injection.

BRIEF DESCRIPTION OF THE DRAWINGS

The invention will be described with reference to the accompanying drawings, wherein like numbers reference like elements.

FIG. 3 is an exploded perspective view schematically illustrating a configuration of an image sensor module.

FIG. 4 is a plan view schematically illustrating a disposition of an image reading chip.

DESCRIPTION OF EXEMPLARY EMBODIMENTS

Hereinafter, a preferred exemplary embodiment according to the invention will be described in detail with reference to the drawings. The drawings are used for convenience of descriptions. The exemplary embodiment which will be described below does not unreasonably limit the details of aspects of the invention described in Claims. All components of a configuration which will be described below are not limited as necessary components for the aspect of the invention.

Hereinafter, a combined machine (combined device) 1 to which an image reading apparatus according to an aspect of the invention will be described in detail with reference to the accompanying drawings.

1. Structure of Combined Machine

Figure 1:
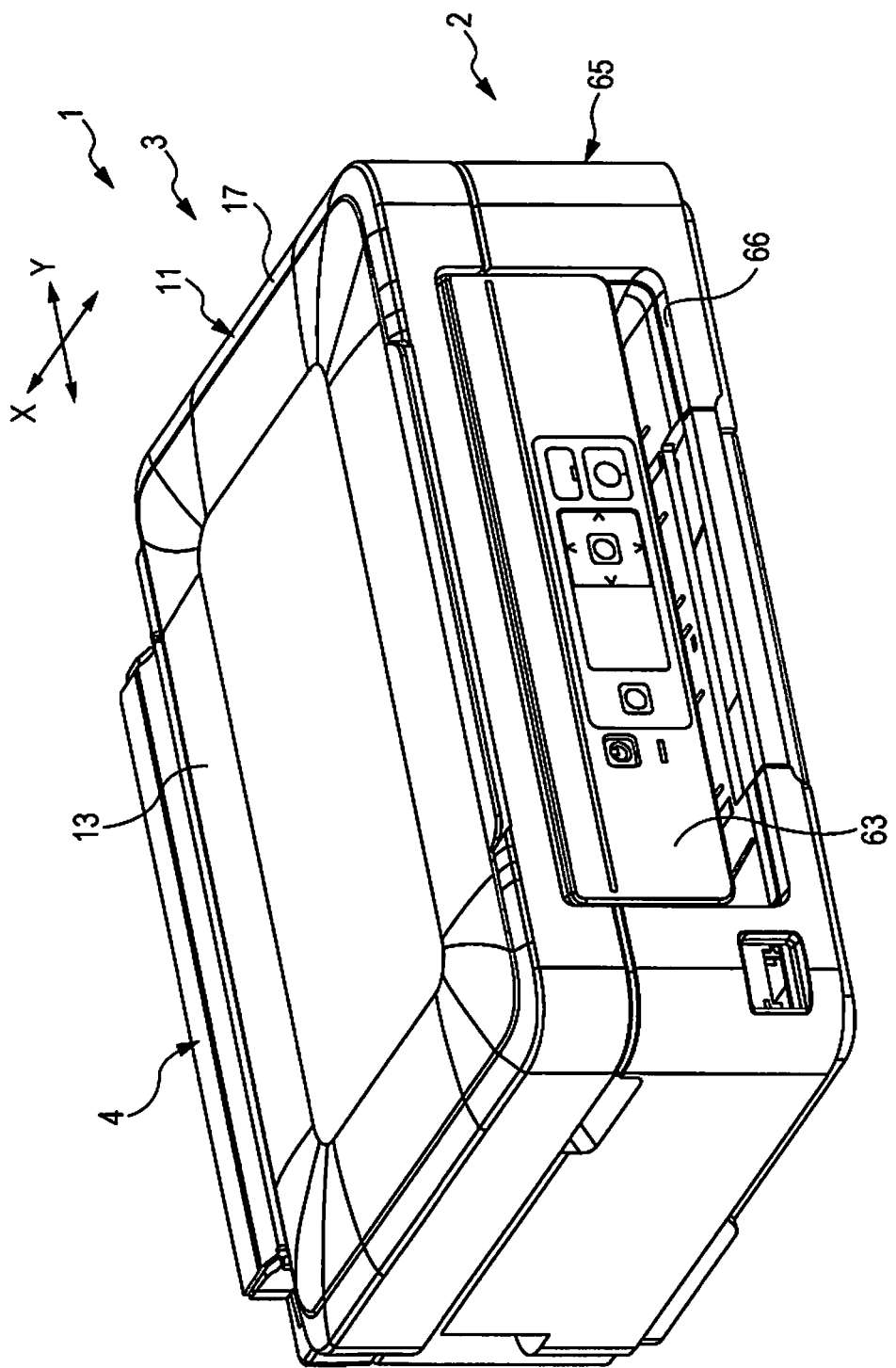
FIG. 1 is an external perspective view illustrating a combined machine according to an exemplary embodiment.

FIG. 1 is an external perspective view illustrating the combined machine 1. As illustrated in FIG. 1, the combined machine 1 integrally includes a printer unit (image recording device) 2 which corresponds to a device main body, and a scanner unit (image reading apparatus) 3. The scanner unit 3 corresponds to an upper unit which is disposed at an upper portion of the printer unit 2. Descriptions will be made on the assumption that a front-rear direction in FIG. 1 is an X axis direction and a crosswise direction is a Y axis direction.

As illustrated in FIG. 1, the printer unit 2 includes a transport unit (not illustrated), a print unit (not illustrated), an operation unit 63, a device frame (not illustrated), and a device housing 65. The transport unit sends a recording medium (print paper or cutform paper) corresponding to a sheet of paper, along a feeding path. The print unit is disposed over the feeding path, and performs printing on the recording medium in an ink jet manner. The operation unit 63 has a panel form, and is disposed on the front surface. In the device frame, the transport unit, the print unit, and the operation unit 63 are mounted. The device housing 65 covers the above components. An exit port 66 through which a recording medium on which printing is ended exits is provided on the device housing 65. Although not illustrated, a USB port and a power port are disposed at a lower portion of the rear surface. That is, the combined machine 1 is configured so as to be allowed to be connected to a computer and the like through the USB port.

The scanner unit 3 is supported so as to be revolvable around the printer unit 2 through the hinge portion 4 at a rear end portion. The scanner unit 3 covers an upper portion of the printer unit 2 so as to be freely opened or closed. That is, the scanner unit 3 is lifted in a revolving direction, and thus an upper-surface opening portion of the printer unit 2 is exposed, and the inside of the printer unit 2 is exposed through the opening portion on the upper-surface opening portion. The scanner unit 3 is pulled down in the revolving direction, and is mounted on the printer unit 2, and thus the upper-surface opening portion is closed by the scanner unit 3. In this manner, the scanner unit 3 is opened, and thus exchange of an ink cartridge, solving paper clogging, or the like can be performed.

Figure 2:
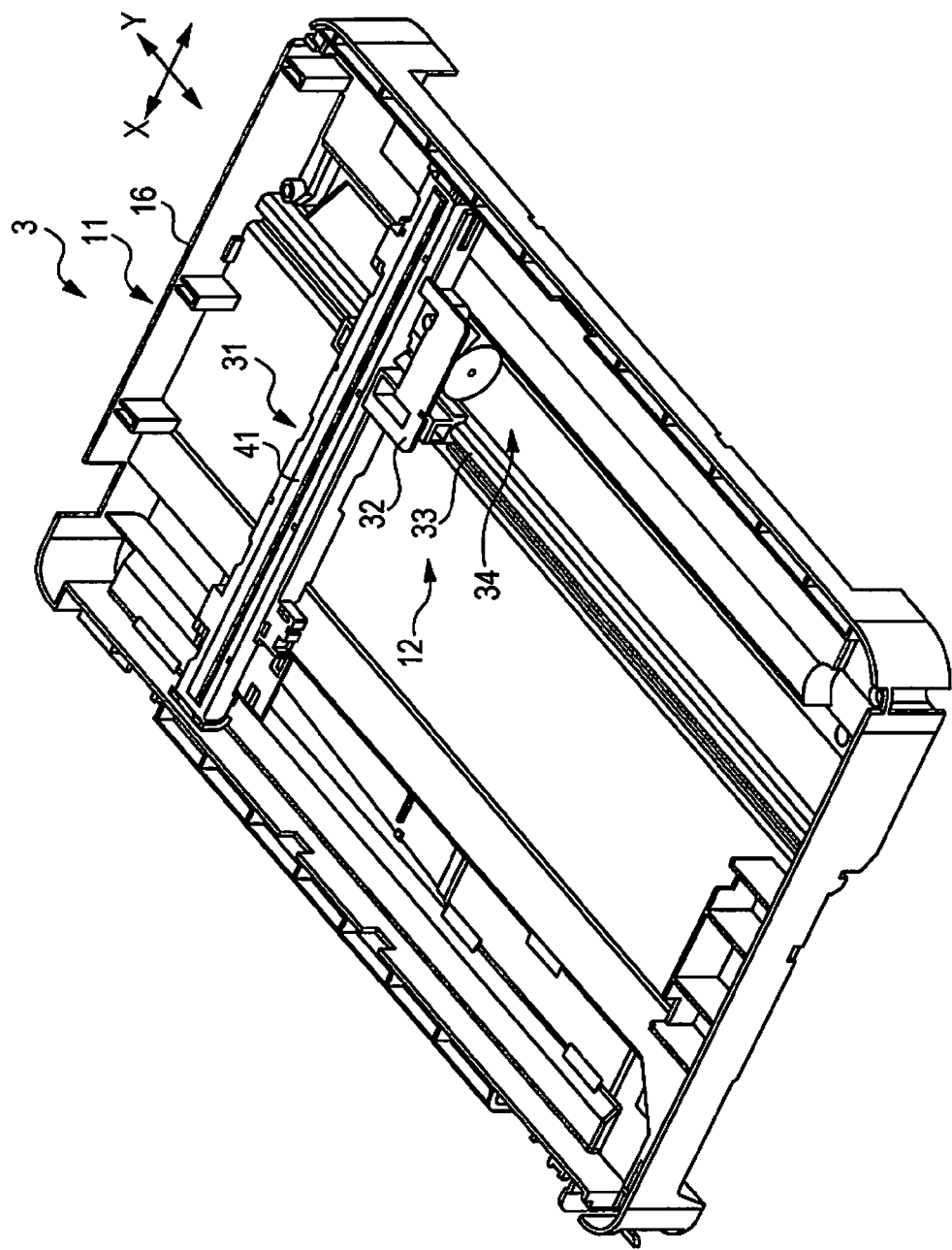
FIG. 2 is a perspective view illustrating an internal structure of a scanner unit.

FIG. 2 is a perspective view illustrating an internal structure of the scanner unit 3. As illustrated in FIGS. 1 and 2, the scanner unit 3 includes an upper frame 11 which is a housing, an image reading unit 12 accommodated in the upper frame 11, and an upper lid 13 supported by an upper portion of the upper frame 11. The upper lid 13 is supported so as to be revolvable. As illustrated in FIG. 2, the upper frame 11 includes a box type lower case 16 which accommodates the image reading unit 12, and an upper case 17 which covers the top surface of the lower case 16. A document mounting panel (document stand not illustrated) formed of glass is widely disposed on the upper case 17. A read medium (original document) of which a read surface is positioned downwardly is mounted on this document mounting panel. The lower case 16 is formed so as to have a shallow box shape of which an upper surface is opened.

As illustrated in FIG. 2, the image reading unit 12 includes a sensor unit 31 of a line sensor type, a sensor carriage 32 in which the sensor unit 31 is mounted, a guide shaft 33 which is extended in the Y axis direction, and slidably supports the sensor carriage 32, and a self-traveling sensor moving mechanism 34 which moves the sensor carriage 32 along the guide shaft 33. The sensor unit 31 includes an image sensor module 41 which is a complementary metal-oxide-semiconductor (CMOS) line sensor extended in the X axis direction. The sensor moving mechanism 34 drives by a motor, and thus the sensor unit 31 performs reciprocation along the guide shaft 33, in the Y axis direction. Thus, an image of the read medium (original document) on the document mounting panel is read. The sensor unit 31 may be a charge coupled device (CCD) line sensor.

FIG. 3 is an exploded perspective view schematically illustrating a configuration of the image sensor module 41. In the example illustrated in FIG. 3, the image sensor module 41 includes a case 411, a light source 412, a lens 413, a module substrate 414, and an image reading chip (semiconductor device) 415 for reading an image. The light source 412, the lens 413, and the image reading chip 415 are accommodated between the case 411 and the module substrate 414. A slit is provided in the case 411. The light source 412 includes, for example, light emitting diodes (LED) of R, G, and B. The light emitting diodes of R, G, and B (red LED, green LED, and blue LED) emit sequentially light while being rapidly switched. Light emitted by the light source 412 is applied to a read medium through the slit, and light from the read medium is input to the lens 413 through the slit. The lens 413 guides the input light to the image reading chip 415.

FIG. 4 is a schematic plan view illustrating a disposition of the image reading chip 415. As illustrated in FIG. 4, a plurality of image reading chips 415 is arranged on the module substrate 414 in a one-dimensional direction (X axis direction in FIG. 4). Each of the image reading chips 415 includes multiple light receiving elements which are disposed in a line (see FIGS. 6 and 10). As density of the light receiving elements provided in each of the image reading chip 415 becomes higher, the scanner unit (image reading apparatus) 3 having high resolution for reading an image can be realized. As the number of the image reading chips 415 becomes more, the scanner unit (image reading apparatus) 3 which can also read a big image can be realized.

2. Functional Configuration of Scanner Unit (Image Reading Apparatus)

Figure 5:
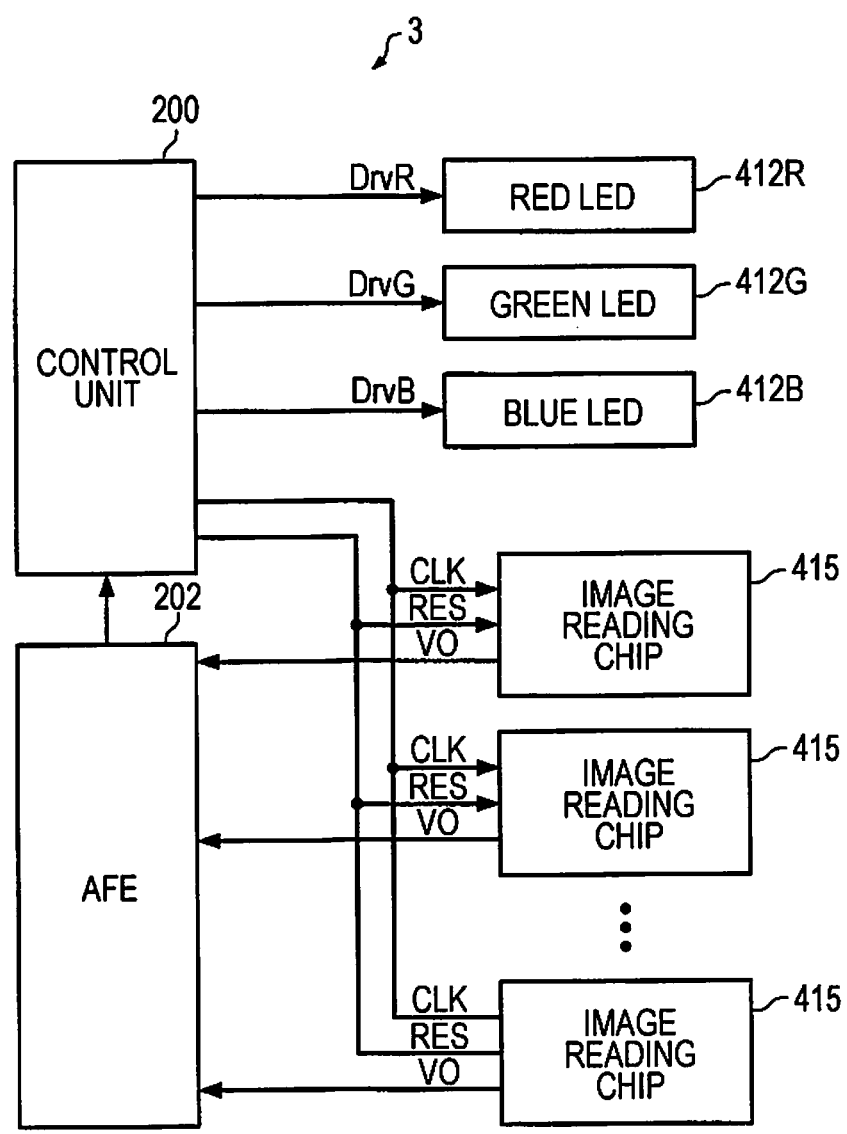
FIG. 5 is a diagram illustrating a functional configuration of the image reading chip.

FIG. 5 is a functional block diagram illustrating a functional configuration of the scanner unit (image reading apparatus) 3. In the example illustrated in FIG. 5, the scanner unit (image reading apparatus) 3 includes a control unit 200, an analog front end (AFE) 202, a red LED 412R, a green LED 412G, a blue LED 412B, and the plurality of image reading chips 415. As described above, the red LED 412R, the green LED 412G, and the blue LED 412B include the light source 412. The plurality of image reading chips 415 is disposed on the module substrate 414 in parallel. A plurality of red LEDs 412R, a plurality of green LEDs 412G, and a plurality of blue LEDs 412B may be provided. The control unit 200 and the analog front end (AFE) 202 are provided on the module substrate 414 or a substrate (not illustrated) which is different from the module substrate 414. Each of the control unit 200 and the analog front end CAFE) 202 may be realized by an integrated circuit (IC).

When a cycle for reading an image is set to be T, the control unit 200 supplies a drive signal DrvR to the red LED 412R for each of 3T, by a predetermined exposure time $\Delta t$, and thus causes the red LED 412R to emit light. Similarly, the control unit 200 supplies a drive signal DrvG to the green LED 412G for each of 3T, by the exposure time Δt, and thus causes the green LED 412G to emit light. The control unit 200 supplies a drive signal DrvB to the blue LED 412B for each of 3T, by the exposure time Δt, and thus causes the blue LED 412B to emit light. The control unit 200 causes any one of the red LED 412R, the green LED 412G, and the blue LED 412B to emit light for each cycle T.

The control unit 200 commonly supplies a clock signal CLK and a resolution setting signal RES to the plurality of the image reading chips 415. The clock signal CLK is an operation clock signal for the image reading chip 415. The resolution setting signal RES is a signal for setting resolution at which the scanner unit (image reading apparatus) 3 reads an image. In the following descriptions, the resolution setting signal RES is a two-bit signal. The resolution setting signal RES is assumed as follows. When the resolution setting signal RES is "00", resolution is set to 1200 dpi. When the resolution setting signal RES is "01", resolution is set to 600 dpi. When the resolution setting signal RES is "10", resolution is set to 300 dpi.

Each of the image reading chips 415 operates with synchronization with the clock signal CLK. The red LED 412R, the green LED 412G, or the blue LED 412B emits light, and thus generates an image signal VO including image information of resolution which is set by the resolution setting signal RES, based on light received from an image which is formed on a read medium by each light receiving element. Each of the image reading chips 415 outputs the generated image signal VO. A circuit configuration and an operation of the image reading chip 415 will be described later in detail.

The analog front end (AFE) 202 receives a plurality of image signals VO which are output by the plurality of the image reading chips 415, and performs amplification or A/D conversion on each of the image signals VO. The analog front end (AFE) 202 converts each of the image signals VO into a digital signal which has a digital value depending on intensity of received light of each of the light receiving elements. The analog front end (AFE) 202 sequentially transmits digital signals to the control unit 200.

The control unit 200 receives the digital signals which are sequentially transmitted from the analog front end (AFE) 202, generates image information which has been read by the image sensor module 41.

3. Circuit Configuration and Operation of Image Reading Chip

Figure 6:
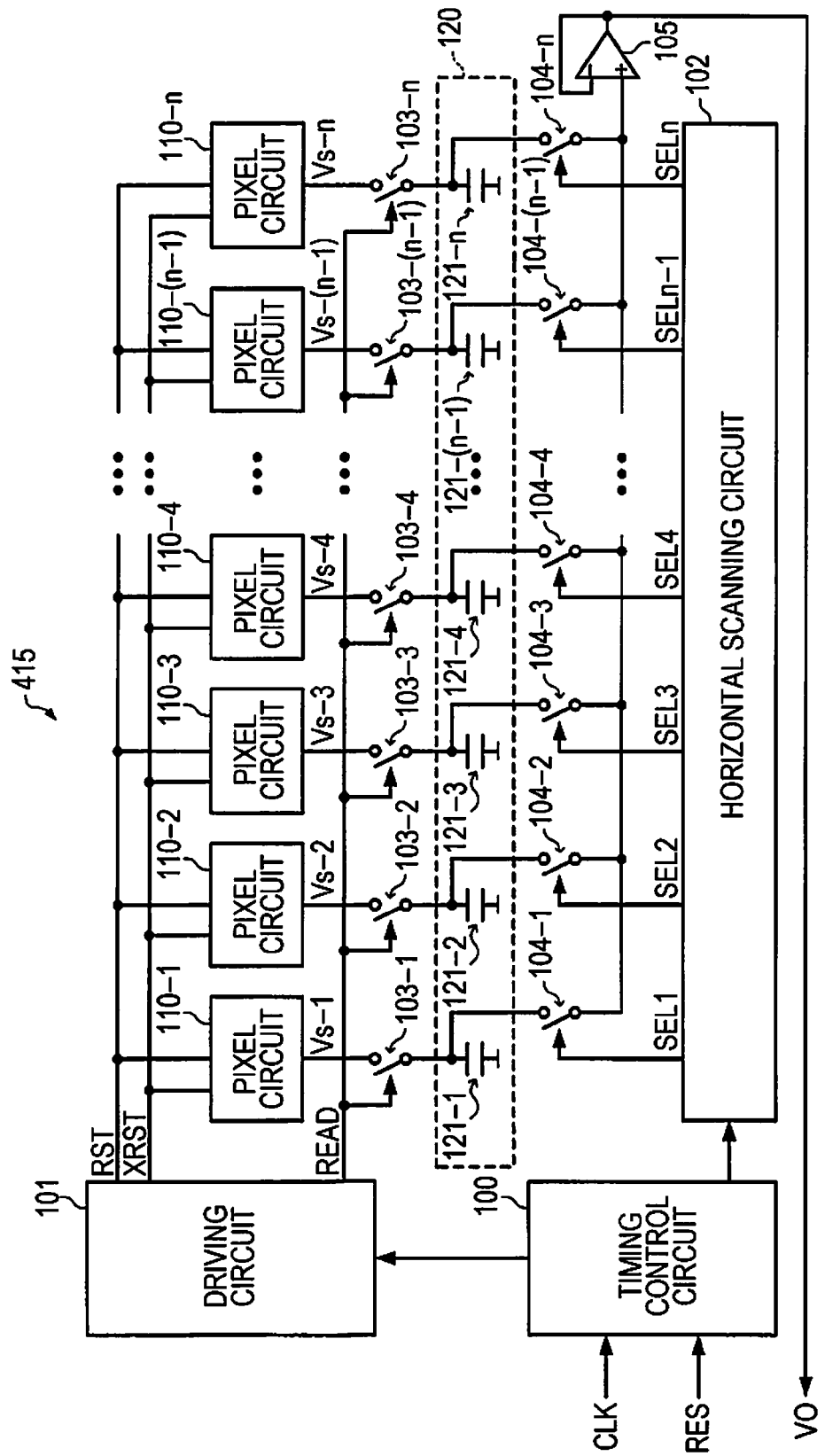
FIG. 6 is a diagram illustrating a circuit configuration of the image reading chip.
Figure 7:
FIG. 7 is a timing chart of signals relating to an operation of the image reading chip.
Figure 8:
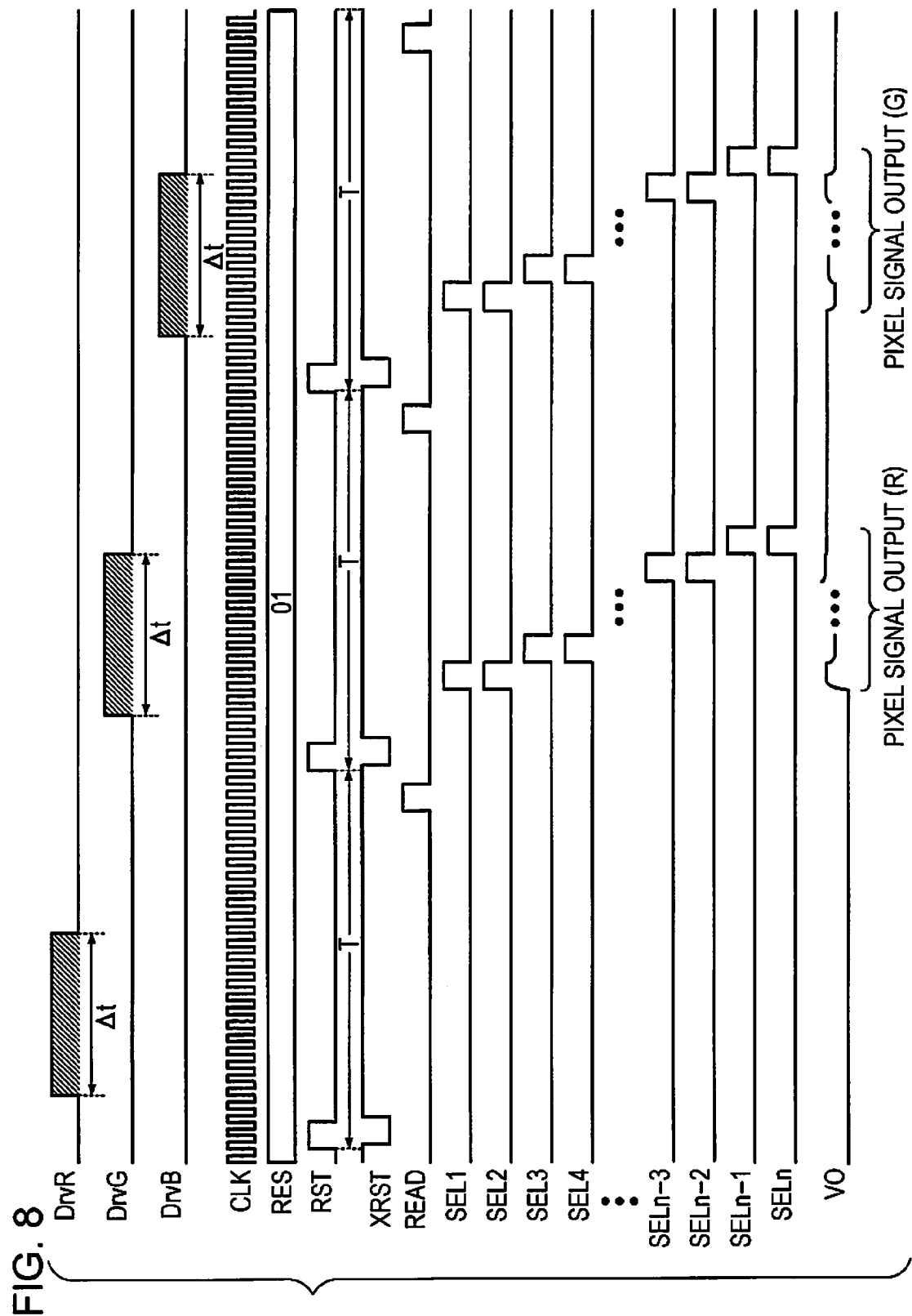
FIG. 8 is a timing chart of signals relating to an operation of the image reading chip.
Figure 9:
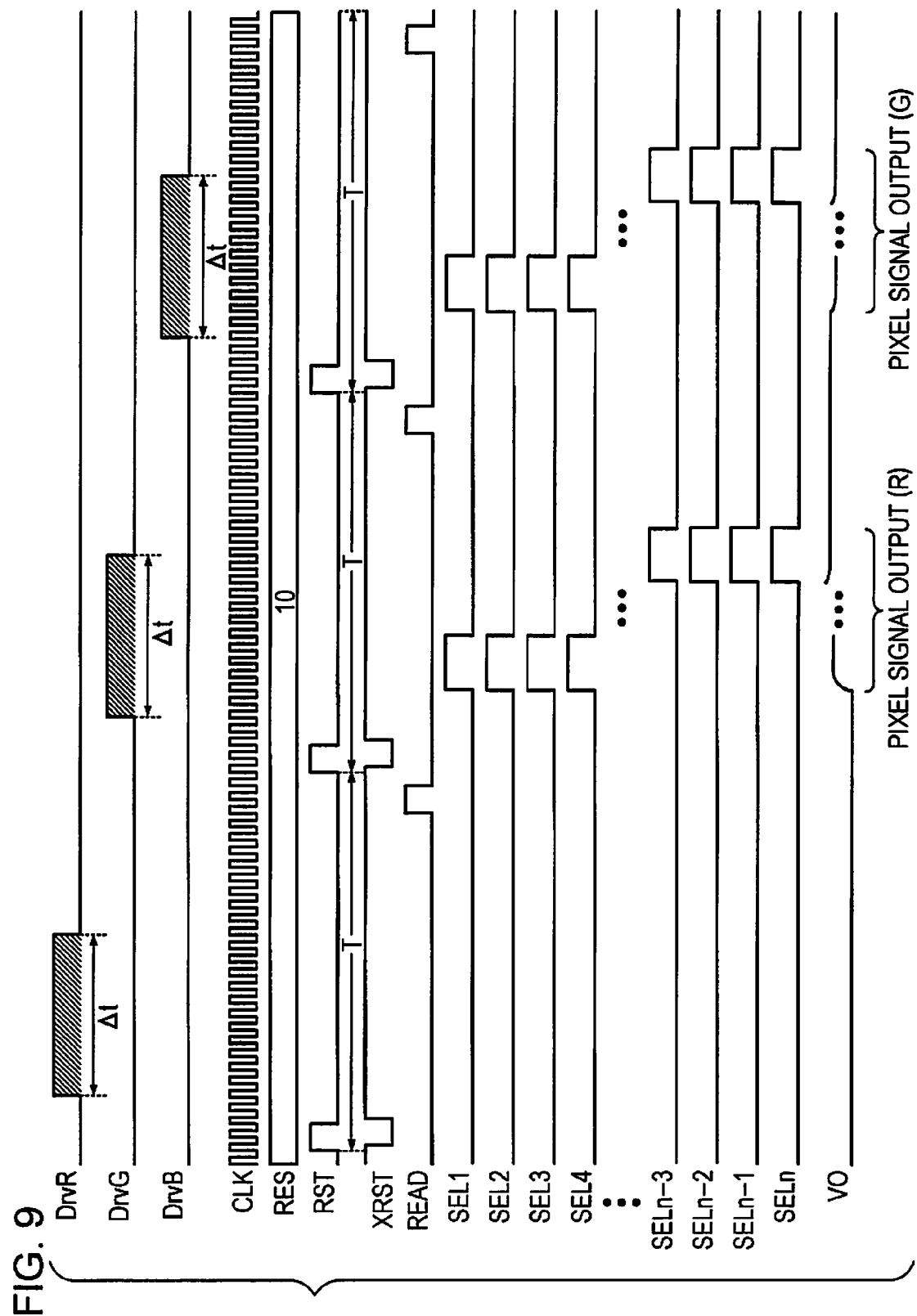
FIG. 9 is a timing chart of signals relating to an operation of the image reading chip.

FIG. 6 is a diagram illustrating a circuit configuration of the image reading chip 415. FIGS. 7, 8, and 9 are timing charts of signals relating to the image reading chip 415 in a case where resolution at which the scanner unit (image reading apparatus) 3 reads an image is set to 1200 dpi, 600 dpi, and 300 dpi.

The image reading chip 415 illustrated in FIG. 6 includes a timing control circuit 100, a driving circuit 101, a horizontal scanning circuit 102, n pieces of pixel circuits 110-1 to 110-n, n pieces of first switch circuits 103-1 to 103-n, n pieces of capacitance elements 121-1 to 121-n, n pieces of second switch circuits 104-1 to 104-n, and an operation amplifier 105.

The timing control circuit 100 counts pulses of the clock signal CLK. The timing control circuit 100 includes a counter (not illustrated) for initializing a count value for each cycle T for reading an image. The timing control circuit 100 generates a control signal for controlling an operation of the driving circuit 101, and a control signal for controlling an operation of the horizontal scanning circuit 102, based on an output value (count value) of the counter.

The driving circuit 101 generates a first reset signal (an example of a first signal) RST at the cycle T, based on the control signal from the timing control circuit 100 (see FIGS. 7 to 9). The first reset signal RST is synchronized with the clock signal CLK, and becomes active (high level in the exemplary embodiment) for a predetermined period at a predetermined timing before the red LED 412R, the green LED 412G, or the blue LED 412B emits light. The driving circuit 101 generates a second reset signal (an example of a second signal) XRST of which potential is changed, after potential of the first reset signal RST is changed (see FIGS. 7 to 9). Specifically, the second reset signal XRST becomes active (low level in the exemplary embodiment) at a predetermined timing before the red LED 412R, the green LED 412G, or the blue LED 412B emits light. Then, the second reset signal XRST becomes inactive (high level in the exemplary embodiment) at the same time when the first reset signal RST is changed from being active (high level) to being inactive (low level) or after that. For example, the second reset signal XRST may be a signal obtained by reversing a polarity of the first reset signal RST (see FIGS. 7 to 9). The first reset signal RST and the second reset signal XRST are commonly supplied to n pieces of the pixel circuits 110-1 to 110-n.

The driving circuit 101 generates a reading signal READ at the cycle T, based on the control signal from the timing control circuit 100 (see FIGS. 7 to 9). The reading signal READ is synchronized with the clock signal CLK, and becomes active (high level in the exemplary embodiment) for a predetermined period at a predetermined timing after the red LED 412R, the green LED 412G, or the blue LED 412B emitting light is ended. The reading signal READ is commonly supplied to third terminals (control terminals) of n pieces of the first switch circuits 103-1 to 103-n.

Each of n pieces of pixel circuits 110-1 to 110-n is initialized by the first reset signal RST and the second reset signal XRST from the driving circuit 101. Then, each of n pieces of pixel circuits 110-1 to 110-n outputs voltages Vs-1 to Vs-n depending on light received from a read medium for an exposure time Δt by the red LED 412R, the green LED 412G, or the blue LED 412B emitting light.

A first terminal of each of n pieces of first switch circuits 103-1 to 103-n is connected to an output terminal of each of n pieces of the pixel circuits 110-1 to 110-n. A second terminal of each of n pieces of the first switch circuits 103-1 to 103-n is connected to one end of each of n pieces of the capacitance elements 121-1 to 121-n. Each of n pieces of the first switch circuits 103-1 to 103-n is conducted (conducted between the first terminal and the second terminal) when the reading signal READ supplied to the third terminal (control terminal) is active (high level). Each of n pieces of the first switch circuits 103-1 to 103-n is unconducted (unconducted between the first terminal and the second terminal) when the reading signal READ is inactive (low level).

Each of n pieces of the capacitance elements 121-1 to 121-n has one end which is connected to an output terminal of each of n pieces of pixel circuits 110-1 to 110-n. A predetermined reference potential (for example, ground potential (0 V)) is commonly applied to another ends of n pieces of capacitance elements 121-1 to 121-n. Thus, for each cycle T, n pieces of the first switch circuits 103-1 to 103-n are conducted for a predetermined period when the reading signal READ is active (high level), and the output terminal of each of n pieces of the pixel circuits 110-1 to 110-n is electrically connected to one end of each of n pieces of the capacitance elements 121-1 to 121-n. Thus, charges depending on each of output voltages Vs-1 to Vs-n of n pieces of the pixel circuits 110-1 to 110-n are held in each of n pieces of the capacitance elements 121-1 to 121-n. In this manner, n pieces of the capacitance elements 121-1 to 121-n constitute a line memory 120 for holding charges which depend on each of the output voltages Vs-1 to Vs-n of n pieces of the pixel circuits 110-1 to 110-n.

A first terminal of each of n pieces of the second switch circuits 104-1 to 104-n is connected to the one end of each of n pieces of the capacitance elements 121-1 to 121-n. A second terminal thereof is commonly connected to a non-inverted input terminal of the operation amplifier 105. Selection signal SEL1 to SELn from the horizontal scanning circuit 102 are supplied to third terminals (control terminals) of n pieces of the second switch circuits 104-1 to 104-n, respectively. When each of the selection signals SEL1 to SELn supplied to the third terminals (control terminals) is active (high level), n pieces of the second switch circuits 104-1 to 104-n is conducted (conducted between the first terminal and the second terminal). When each of the selection signal SEL1 to SELn is inactive (low level), n pieces of the second switch circuits 104-1 to 104-n is unconducted (unconducted between the first terminal and the second terminal).

The horizontal scanning circuit 102 generates n pieces of selection signals SEL1 to SELn based on the control signal and the resolution setting signal RES from the timing control circuit 100 (see FIGS. 7 to 9). Each of n pieces of the selection signals SEL1 to SELn is synchronized with the clock signal CLK, and becomes active (high level in the exemplary embodiment) for a predetermined period at a predetermined timing before the reading signal READ becomes active (high level) on the cycle T (after the reading signal READ is changed from being active (high level) to being inactive (low level) on a cycle T before one cycle). When the resolution setting signal RES is "00" (when the resolution is set to 1200 dpi), the horizontal scanning circuit 102 generates n pieces of the selection signals SEL1 to SELn which sequentially become active (high level) one by one for each one cycle of the clock signal (see FIG. 7). When the resolution setting signal RES is "01" (when the resolution is set to 600 dpi), the horizontal scanning circuit 102 generates n pieces of the selection signals SEL1 to SELn which simultaneously become active (high level) by two for each of two cycles of the clock signal in an order (see FIG. 8). When the resolution setting signal RES is "10" (when the resolution is set to 300 dpi), the horizontal scanning circuit 102 generates n pieces of the selection signals SEL1 to SELn which simultaneously become active (high level) by four for each of four cycles of the clock signal in an order (see FIG. 9).

The operation amplifier 105 has the non-inverted input terminal to which the second terminal of each of n pieces of the second switch circuits 104-1 to 104-n is commonly connected. An inverted input terminal and the output terminal thereof are connected to each other. The operation amplifier 105 is a voltage follower, and an output voltage of the operation amplifier 105 coincides with a voltage at the non-inverted input terminal. The output signal of the operation amplifier 105 is output as an image signal VO, from the image reading chip 415. Thus, when the resolution setting signal RES is "01" (when the resolution is set to 1200 dpi), the voltage of the image signal VO becomes one voltage which is sequentially selected by n pieces of the selection signals SEL1 to SELn, among voltages (voltage depending on charges held on the cycle T before one cycle) of one ends of n pieces of capacitance elements 121-1 to 121-n, for a predetermined duration on the cycle T (see FIG. 7). When the resolution setting signal RES is "01" (when the resolution is set to 600 dpi), the voltage of the image signal VO becomes an average voltage of two voltages which are sequentially selected by n pieces of the selection signals SEL1 to SELn, among voltages (voltage depending on charges held on the cycle T before one cycle) of one ends of n pieces of capacitance elements 121-1 to 121-n, for a predetermined duration on the cycle T (see FIG. 8). When the resolution setting signal RES is "10" (when the resolution is set to 300 dpi), the voltage of the image signal VO becomes an average voltage of four voltages which are sequentially selected by n pieces of the selection signals SEL1 to SELn, among voltages (voltage depending on charges held on the cycle T before one cycle) of one ends of n pieces of capacitance elements 121-1 to 121-n, for a predetermined duration on the cycle T (see FIG. 9).

4. Configuration and Operation of Pixel Circuit

All of n pieces of pixel circuits 110-1 to 110-n illustrated in FIG. 6 have the same configuration. Thus, a configuration and an operation will be described below on the assumption that all of n pieces of pixel circuits 110-1 to 110-n are described as a pixel circuit 110, and all of the output voltages Vs-1 to Vs-n of n pieces of pixel circuits 110-1 to 110-n are described as an output voltage Vs.

Figure 10:
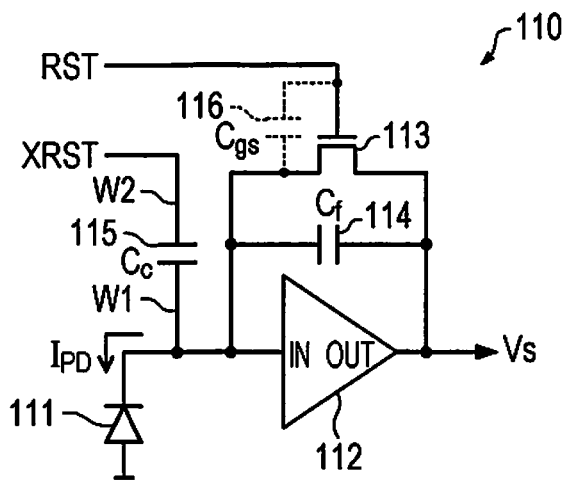
FIG. 10 is a diagram illustrating a configuration of a pixel circuit.

FIG. 10 is a diagram illustrating a configuration of the pixel circuit 110. As illustrated in FIG. 10, the pixel circuit 110 includes a light receiving element 111, an amplification unit 112, a switch element 113, first capacitance 114, and second capacitance 115.

The light receiving element 111 receives light (in the exemplary embodiment, light from an image formed on a read medium), and converts (photoelectrically-converts) the received light into an electric signal. In the exemplary embodiment, the light receiving element 111 is configured by a photodiode. An anode of the light receiving element 111 is grounded, and a cathode thereof is electrically connected to an input terminal IN of the amplification unit 112.

The amplification unit 112 is electrically connected to the light receiving element 111, and amplifies a signal generated by the light receiving element 111 performing photoelectric conversion. Specifically, the amplification unit 112 is an inverting amplifier which has the input terminal IN which is electrically connected to the cathode of the light receiving element 111, and outputs a voltage obtained by multiplying the voltage of the input terminal IN by −G, from the output terminal OUT. The output voltage of the amplification unit 112 becomes the output voltage Vs of the pixel circuit 110.

The switch element 113 is electrically connected to both of the ends (input terminal IN and output terminal OUT) of the amplification unit 112, so as to be parallel with the amplification unit 112. The first reset signal RST is input to the control terminal of the switch element 113. When the first reset signal RST becomes active (high level), both of the ends of the switch element 113 are conducted. When the first reset signal RST becomes inactive (low level), both of the ends of the switch element 113 are unconducted. In the exemplary embodiment, the switch element 113 is an NMOS transistor of which the first reset signal RST is input to a gate terminal which is the control terminal, one of the source terminal and the drain terminal is connected to the input terminal IN of the amplification unit 112, and another of the source terminal and the drain terminal is connected to the output terminal OUT of the amplification unit 112.

The first capacitance 114 is electrically connected to both of the ends (input terminal IN and output terminal OUT) of the amplification unit 112, so as to be parallel with the amplification unit 112. That is, the first capacitance 114 functions as feedback capacitance provided on a signal feedback path from the output terminal OUT of the amplification unit 112 to the input terminal IN thereof. The first capacitance 114 has a capacitance value $C_f$.

The second capacitance 115 has one end which is electrically connected to one end of the light receiving element 111 and one end (input terminal IN) of the amplification unit 112, and another end to which the second reset signal XRST is applied. The second capacitance 115 has a capacitance value $C_c$.

Figure 11:
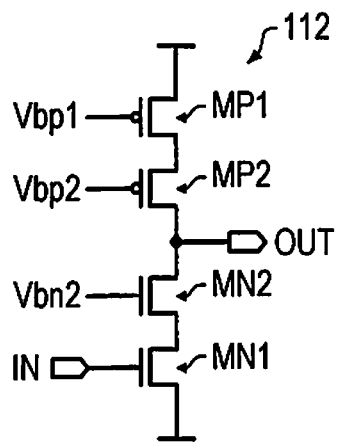
FIG. 11 is a diagram illustrating a circuit configuration of an amplification unit.

FIG. 11 is a diagram illustrating a circuit configuration of the amplification unit 112 which is an inverting amplifier. As illustrated in FIG. 11, the amplification unit 112 includes an NMOS transistor MN1, an NMOS transistor MN2, a PMOS transistor MP1, and a PMOS transistor MP2.

The NMOS transistor MN1 has a gate terminal which is connected to the input terminal IN of the amplification unit 112, a source terminal which is grounded, and a drain terminal which is connected to a source terminal of the NMOS transistor MN2. Thus, the signal generated by photoelectric conversion of the light receiving element 111 is input to the gate terminal of the NMOS transistor MN1.

The NMOS transistor MN2 has a gate terminal to which a constant bias voltage Vbn2 is supplied, a source terminal which is connected to the drain terminal of the NMOS transistor MN1, and a drain terminal which is connected to a drain terminal of the PMOS transistor MP2 and the output terminal OUT of the amplification unit 112. That is, the NMOS transistor MN2 is electrically connected to a node between the NMOS transistor MN1 and the output terminal OUT of the amplification unit 112. The NMOS transistor MN1 and the NMOS transistor MN2 are cascode-connected.

The PMOS transistor MP1 has a gate terminal to which a constant bias voltage Vbp1 is supplied, a source terminal to which a power source voltage supplied to the image reading chip 415 from the outside of the circuit is applied, and a drain terminal which is connected to a source terminal of the PMOS transistor MP2.

The PMOS transistor MP2 has a gate terminal to which a constant bias voltage Vbp2 is supplied, a source terminal which is connected to the drain terminal of the PMOS transistor MP1, and a drain terminal which is connected to the drain terminal of the NMOS transistor MN2 and the output terminal OUT of the amplification unit 112.

The bias voltages Vbn2, Vbp1, and Vbp2 are constant voltages for operating each of the NMOS transistor MN2, the PMOS transistor MP1, and the PMOS transistor MP2 in a saturated region. In FIGS. 10 and 11, a constant voltage source (not illustrated) generates the bias voltages Vbn2, Vbp1, and Vbp2.

In the amplification unit 112 having such a configuration, the PMOS transistor MP1 functions as a constant voltage source. A constant current from the PMOS transistor MP1 flows between the drain and the source of the NMOS transistor MN1, and thus a drain voltage of the NMOS transistor MN1 becomes a voltage obtained by inverting and amplifying a voltage at the input terminal IN. The NMOS transistor MN2 and the PMOS transistor MP2 are provided so as to increase output impedance. In other words, the NMOS transistor MN2 and the PMOS transistor MP2 are provided so as to increase a voltage amplification rate G. Thus, the voltage amplification rate G which is equal to or more than 1000 times is realized.

Figure 12:
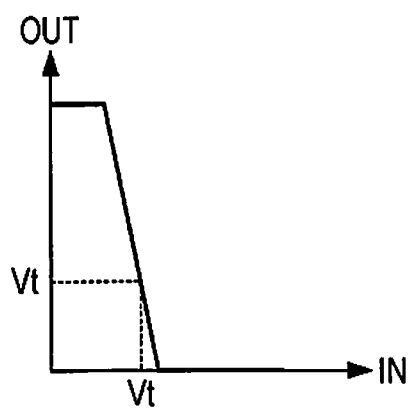
FIG. 12 is a diagram illustrating voltage characteristics between an input and an output of the amplification unit.

FIG. 12 is a diagram illustrating voltage characteristics between an input and an output of the amplification unit 112 which is configured as illustrated in FIG. 11. In FIG. 12, a horizontal axis indicates the voltage at the input terminal IN, and a vertical axis indicates the voltage of the output terminal OUT. As illustrated in FIG. 12, the amplification unit 112 sets the voltage of the output terminal OUT to be a threshold voltage Vt of the inverting amplifier illustrated in FIG. 11, when the voltage of the input terminal IN is the threshold voltage Vt. The threshold voltage Vt is expressed by the following Expression (1).

$$Vt = Vth + \sqrt{\frac{2 \cdot Id}{\mu \cdot C_{ox}} \cdot \frac{L}{W}} \qquad (1)$$

In Expression (1), Vth indicates a threshold voltage of the NMOS transistor MN1, Id indicates a current flowing in the NMOS transistor MN1, $\mu$ indicates mobility, Cox indicates gate capacitance per unit area, L indicates a gate length of the NMOS transistor MN1, and W indicates a gate width of the NMOS transistor MN1.

In FIG. 12, an absolute value of an inclination of a region in which the voltage of the output terminal OUT is linearly changed, to the voltage of the input terminal IN corresponds to the voltage amplification rate G of the amplification unit 112. The voltage amplification rate G is adjusted so as to be equal to or more than 1000 times.

Figure 13:
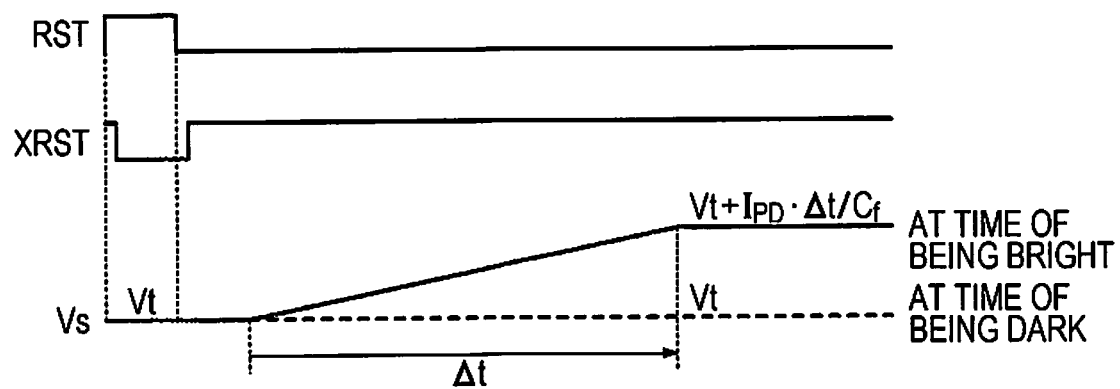
FIG. 13 is a timing chart illustrating an operation of the pixel circuit according to an exemplary embodiment.
Figure 14:
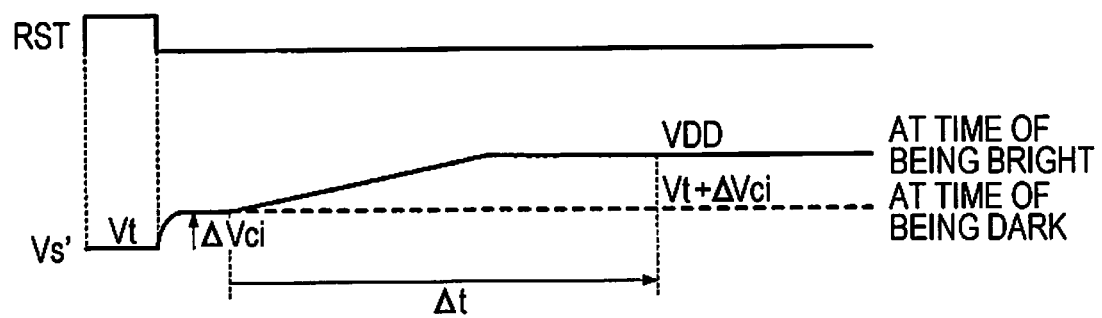
FIG. 14 is a timing chart illustrating an operation of the pixel circuit according to a comparative example.

Next, an operation of the pixel circuit 110 will be described. FIG. 13 is a timing chart illustrating an operation of the pixel circuit 110 having the configuration in FIG. 10. FIG. 14 is a timing chart illustrating an operation of a pixel circuit (pixel circuit in a comparative example) in a case where the second capacitance 115 is not provided in FIG. 10.

As illustrated in FIGS. 13 and 14, firstly, the first reset signal RST becomes a high level and the switch element 113 is conducted. Thus, both of the ends (input terminal IN and output terminal OUT) of the amplification unit 112 are disconnected. Thus, the input voltage and the output voltage of the amplification unit 112 (the output voltage Vs of the pixel circuit 110 and the output voltage Vs' of the pixel circuit of the comparative example) become the threshold voltage Vt together (see FIGS. 13 and 14). If the input voltage and the output voltage are the threshold voltage Vt, potentials at both of the ends of the first capacitance 114 are equal to each other. Thus, charges held in the first capacitance 114 are left. At this time, if the potential (high level) of the first reset signal RST is set to be VDD, a potential difference of VDD-Vt occurs at both ends of a gate-source capacitance 116 (see FIG. 10) which is parasitic capacitance between the gate (control terminal) and the source (terminal connected to one end of the second capacitance 115) of the switch element 113. Thus, charges (positive charges) are accumulated in the gate-source capacitance 116.

In the pixel circuit 110, the second reset signal XRST becomes a low level at the same time when the first reset signal RST becomes a high level or after that (see FIG. 13). At this time, if the potential (low level) of the second reset signal XRST is set to 0 V, a potential difference of −Vt occurs at both of the ends of the second capacitance 115, and thus charges (negative charges) of the second capacitance 115 are accumulated.

Then, if the first reset signal RST becomes a low level, the switch element 113 is unconducted. If the switch element 113 is unconducted, in the pixel circuit of the comparative example, charges accumulated in the gate-source capacitance 116 of the switch element 113 moves to an input node of the amplification unit 112 (charge injection). Thus, an output voltage of the amplification unit 112 (output voltage Vs' of the pixel circuit) is increased by ΔVci (see FIG. 14).

In the pixel circuit 110, the charges accumulated in the gate-source capacitance 116 are cancelled with charges accumulated in the second capacitance 115. Thus, the input voltage and the output voltage (output voltage Vs of the pixel circuit 110) of the amplification unit 112 are maintained to be Vt (see FIG. 13).

Then, the red LED 412R, the green LED 412G, or the blue LED 412B emits light by the exposure time Δt. If the light receiving element 111 does not receive light from the read medium for the exposure time Δt, photoelectric conversion by the light receiving element 111 is not performed, and a current does not flow from the cathode to the anode. Thus, in the pixel circuit in the comparative example, the output voltage of the amplification unit 112 (output voltage Vs' of the pixel circuit) is maintained to be Vt+ΔVci (broken line in FIG. 14). In the pixel circuit 110, the output voltage of the amplification unit 112 (output voltage Vs of the pixel circuit 110) is maintained to be Vt (broken line in FIG. 13).

If the light receiving element 111 receives light from the read medium for the exposure time Δt, a current $I_{PD}$ flows from the cathode to the anode. The current $I_{PD}$ causes charges to be accumulated in the first capacitance 114, and the input voltage of the amplification unit 112 is decreased. Thus, in the pixel circuit in the comparative example, the output voltage of the amplification unit 112 (output voltage Vs' of the pixel circuit) is increased (solid line in FIG. 14). Similarly, in the pixel circuit 110, the output voltage of the amplification unit 112 (output voltage Vs of the pixel circuit 110) is increased (solid line in FIG. 13).

At this time, the output voltage Vs' of the pixel circuit in the comparative example is expressed as with the following Expression (2), by using the threshold voltage Vt of the amplification unit 112, the current $I_{PD}$ flowing in the light receiving element ill, the exposure time Δt, the capacitance value $C_f$ of the first capacitance 114, the voltage amplification rate G of the amplification unit 112, and parasitic capacitance $C_{PD}$ between the anode and the cathode of the light receiving element 111.

$$Vs' = Vt + \Delta Vci + \frac{I_{PD} \cdot \Delta t}{(1 + 1/G) \cdot C_f + C_{PD}/G} \quad (2)$$

If it is assumed that the charges accumulated in the gate-source capacitance 116 are completely cancelled, ΔVci=0 is satisfied, and thus the output voltage Vs of the pixel circuit 110 is expressed as with the following Expression (3).

$$Vs = Vt + \frac{I_{PD} \cdot \Delta t}{(1 + 1/G) \cdot C_f + C_{PD}/G} \quad (3)$$

Here, the voltage amplification rate G of the amplification unit 112 is equal to more than 1000, and thus it can be considered that 1/G and $C_{PD}/G$ on the right sides of Expression (2) and Expression (3) are 0. Thus, the output voltage Vs' of the pixel circuit in the comparative example is approximate as in Expression (4), and the output voltage Vs of the pixel circuit 110 is approximate as in Expression (5).

$$Vs' \cong Vt + \Delta Vci + \frac{I_{PD} \cdot \Delta t}{C_f} \quad (4)$$

$$Vs \cong Vt + \frac{I_{PD} \cdot \Delta t}{C_f} \quad (5)$$

As apparent from Expression (5), sensitivity of the pixel circuit 110 (a changed amount of the output voltage Vs to the current $I_{PD}$ flowing in the light receiving element 111) is inversely proportional to the capacitance value $C_f$ of the first capacitance 114. Thus, in order to improve the sensitivity of the pixel circuit 110 or the sensitivity of the image reading chip 415 or the scanner unit (image reading apparatus) 3, it is desirable that the capacitance value $C_f$ of the first capacitance 114 be small.

Here, for example, if an upper limit of the output voltage Vs' of the pixel circuit in the comparative example, and an upper limit of the output voltage Vs of the pixel circuit 110 are assumed to be the power source voltage VDD, as apparent from Expression (4), the output voltage Vs' of the pixel circuit in the comparative example is saturated by the power source voltage VDD when $I_{PD} \cdot \Delta t/C_f$ is more than VDD−(Vt+ΔVci) (see FIG. 14). As apparent from Expression (5), the output voltage Vs of the pixel circuit 110 does not reach the power source voltage VDD as long as $I_{PD} \cdot \Delta t/C_f$ is not more than VDD-Vt (see FIG. 13). In brief, the pixel circuit 110 enables the dynamic range of the output voltage Vs to be wider than that of the pixel circuit in the comparative example. In other words, the image reading chip 415 enables an occurrence of narrowing the dynamic range of the output signal (image signal VO). In addition, in the pixel circuit 110, since it is possible to widen the dynamic range of the output voltage Vs, it is possible to cause the capacitance value $C_f$ of the first capacitance 114 to be smaller than that of the pixel circuit in the comparative example. Accordingly, it is possible to improve sensitivity. Thus, it is possible to improve sensitivity of the image reading chip 415 or the scanner unit (image reading apparatus) 3.

5. Configuration of Second Capacitance

Since the charges accumulated in the gate-source capacitance 116 are sufficiently cancelled with the charges accumulated in the second capacitance 115, it is necessary that the capacitance value $C_c$ of the second capacitance 115 is substantially the same as the capacitance value $C_{gs}$ of the gate-source capacitance 116. The capacitance value $C_c$ of the second capacitance 115 is desirably equal to or more than the capacitance value $C_{gs}$ of the gate-source capacitance 116. Here, "the capacitance value $C_c$ of the second capacitance 115 being equal to the capacitance value $C_{gs}$ of the gate-source capacitance 116" includes a case where the capacitance value $C_c$ has a margin for the value of the capacitance value $C_{gs}$, which is caused by a manufacturing error and the like of the switch element 113 or the second capacitance 115, in addition to a case where the capacitance value $C_c$ accurately coincides with the capacitance value $C_{gs}$. Generally, the capacitance value $C_{gs}$ of the gate-source capacitance 116 is about 1 fF (femto Farad), and thus realizing the second capacitance 115 which has a small capacitance value $C_c$ of about 1 fF is required.

As a general method for realizing the second capacitance 115 which has the small capacitance value $C_c$ as described above, on the semiconductor substrate of the image reading chip 415, a method using MOS capacitance, PIP capacitance, or MIM capacitance has been known.

The MOS capacitance corresponds to a gate capacitance of an MOS transistor. In the MOS capacitance, capacitance per unit area is relatively large. Thus, it is possible to realize a small capacitance value with a small area. As a general method of correcting charge injection, a method of using MOS capacitance is also known. A method in which the second capacitance 115 is realized by MOS capacitance which uses an NMOS transistor having a gate width which is the half of the gate width of the switch element 113, and a second reset signal XRST having a phase reverse to that of the first reset signal RST is applied to the gate thereof is considered. However, in this method, a leakage current is generated from the source or the drain of the NMOS transistor, due to crystal defects of the NMOS transistor, metal contamination, or the like. The leakage current flows into the input node (one end of the first capacitance 114) of the amplification unit 112, which is connected to the source or the drain, and thus charges are accumulated in the first capacitance 114. If the charges are accumulated, the output voltage of the amplification unit 112 (output voltage Vs of the pixel circuit 110) is increased by the leakage current, and thus image quality is deteriorated, or image defects (image defects referred to as so-called a "white flaw") occurs. The white flaws occur by seeming to receive light even though the light receiving element 111 does not receive light. Thus, in the pixel circuit 110, it is difficult to realize the second capacitance 115 by using MOS capacitance.

The PIP capacitance is capacitance configured by two polysilicon wires and an insulating interlayer film. The polysilicon wires are provided in two layers, respectively. The insulating interlayer film is provided between the two polysilicon wires. A process which is not required in the general manufacturing process and in which a polysilicon wire in the second layer is formed is additionally required for realizing the PIP capacitance. Thus, cost is increased.

The MIM capacitance is capacitance configured by two metallic wires and an insulating interlayer film. The two metallic wires are provided in two layers, respectively. The insulating interlayer film is provided between the two metallic wires. In order to realize the MIM capacitance, it is necessary that a process of thinning the interlayer insulating film between the two metallic insulating layers is added to the general manufacturing process. Thus, cost is increase.

As described above, if the second capacitance 115 is realized by using MOS capacitance, PIP capacitance, or MIM capacitance, deterioration of image quality, an occurrence of image defects, or an increase of cost occurs. Thus, the above-described method is not the optimum method.

Thus, in the exemplary embodiment, the second capacitance 115 is configured as interconnect capacitance. The wires are a first wire W1 (see FIG. 10) and a second wire W2 (see FIGS. 6 and 10). The first wire W1 electrically connects one end (cathode) of the light receiving element 111, one end (input terminal IN) of the amplification unit 112, one end of the switch element 113, and one end of the first capacitance 114. The second wire W2 is connected to the output terminal of the driving circuit 101 (terminal at which the second reset signal XRST is output), and is used for propagating the second reset signal XRST. In particular, the first wire W1 and the second wire W2 constituting the second capacitance 115 are provided in the same wiring layer among a plurality of wiring layers included on the semiconductor substrate of the image reading chip 415. The wiring layer in which the first wire W1 and the second wire W2 constituting the second capacitance 115 are provided may be the bottom wiring layer, or the top wiring layer, or a wiring layer between the bottom wiring layer and the top wiring layer, among the plurality of wiring layers.

In this manner, the second capacitance 115 is configured as interconnect capacitance between the first wire W1 and the second wire W2 which are provided in the same wiring layer, and thus it is possible to realize small capacitance value $C_c$. The second capacitance 115 configured as the interconnect capacitance does not generate a leakage current. Thus, deterioration of image quality or the occurrence of image defects is difficult. Since such second capacitance 115 is realized in a process included in the general manufacturing process, an additional process is not required, and cost is not increased. Further, the second capacitance 115 may be disposed in a wiring layer higher than a layer in which various elements such as a MOS transistor and a resistor are formed, and be disposed so as to overlap a region in which the element is formed when viewed in a plan of the semiconductor substrate. Thus, it is also effective in reducing a size of the image reading chip 415.

As described above, it is necessary that the capacitance value $C_c$ of the second capacitance 115 is small, for example, about 1 fF. The thickness of the first wire W1 or the second wire W2 (thickness in a direction perpendicular to the semiconductor substrate) is significantly smaller than the minimum wiring width defined in the design rule. In addition, it is not possible to set a gap (distance) from the first wire W1 or the second wire W2 to be equal to or less than the minimum gap (minimum distance) defined in the design rule. If doing so, for example, if the second capacitance 115 having capacitance value $C_c$ of 1 fF is assumed to be configured by interconnect capacitance between the first wire W1 and the second wire W2 which are linear and are provided in the same wiring layer, the first wire W1 and the second wire W2 are significantly long, and a chip area of the image reading chip 415 is increased.

Figure 15:
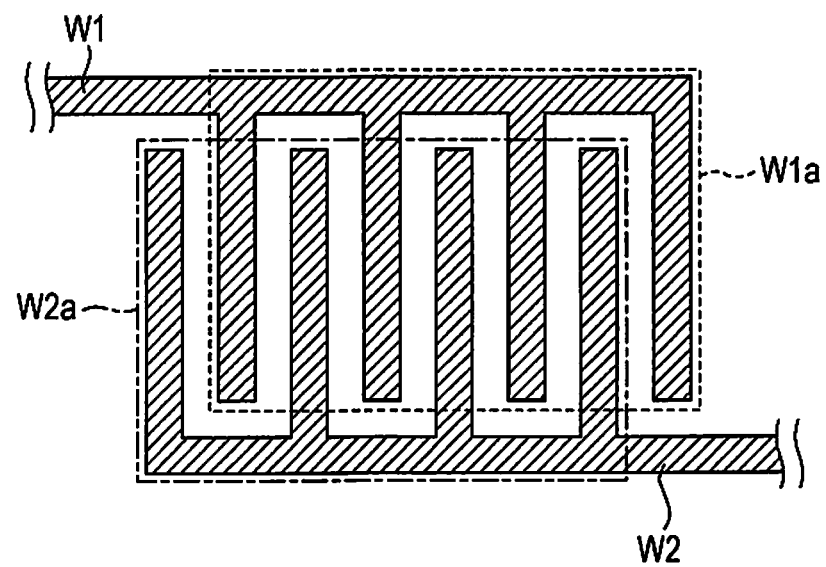
FIG. 15 is a diagram illustrating an example of a first wire and a second wire constituting second capacitance.

Thus, in the exemplary embodiment, the shape of the first wire W1 and the second wire W2 constituting the second capacitance 115 is considered in order to suppress an increase of the chip area. FIG. 15 is a diagram illustrating an example of the first wire W1 and the second wire W2 constituting the second capacitance 115 in the exemplary embodiment. Each of the first wire W1 and the second wire W2 may be configured so as to cause wires in the plurality of wiring layers to be connected to each other by using a connector or a via. However, FIG. 15 illustrates only a portion constituting the second capacitance 115 when the semiconductor substrate of the image reading chip 415 is viewed in plan.

As illustrated in FIG. 15, in the exemplary embodiment, the first wire W1 has a first comb-tooth shaped portion W1a, and the second wire W2 has a second comb-tooth shaped portion W2a. First comb-tooth shaped portions W1a and second comb-tooth shaped portions W2a are provided so as to mesh with each other. At this time, the second capacitance 115 corresponds to capacitance between the first comb-tooth shaped portion W1a and the second comb-tooth shaped portion W2a. It is not possible to set a gap between the first comb-tooth shaped portion W1a and the second comb-tooth shaped portion W2a to be smaller than the minimum gap defined in the design rule. However, because an area of portions at which the first comb-tooth shaped portions W1a and the second comb-tooth shaped portions W2a face each other is large, it is possible to realize the capacitance value $C_c$ of about 1 fF with a small area. Further, if wiring having such a small area is provided, it is easy to perform disposition so as to overlap a region in which various elements are formed when viewed in a plan of the semiconductor substrate, and it is very effective in reducing the size of the image reading chip 415.

6. Advantages

As described above, according to the scanner unit (image reading apparatus) 3 of the exemplary embodiment, in the image reading chip 415, at least some of charges accumulated in the gate-source capacitance 116 of the switch element 113 in a state where both of the ends of the switch element 113 are disconnected when the first reset signal RST is a high level are cancelled with charges accumulated in the second capacitance 115 by the second reset signal XRST in a state where the first reset signal RST is changed to a low level, and thus both of the ends of the switch element 113 are opened. Thus, it is possible to reduce the occurrence of narrowing a dynamic range of the output signal of the amplification unit 112 due to charge injection. Accordingly, according to the scanner unit (image reading apparatus) 3 of the exemplary embodiment, it is possible to ensure a sufficient dynamic range of the output signal of the image reading chip 415, and thus it is possible to read an image with high sensitivity.

According to the scanner unit (image reading apparatus) 3 of the exemplary embodiment, in the image reading chip 415, since the second reset signal XRST is obtained by reversing the polarity of the first reset signal RST used for controlling the switch element 113, it is possible to reduce an occurrence of narrowing a dynamic range of an output signal due to charge injection, without a little increase of a circuit size.

According to the scanner unit (image reading apparatus) 3 of the exemplary embodiment, in the image reading chip 415, since the second capacitance 115 is realized by the interconnect capacitance between the first wire W1 and the second wire W2, the leakage current is not generated as in the MOS capacitance. Accordingly, deterioration of image quality or an occurrence of image defects is difficult.

According to the scanner unit (image reading apparatus) 3 of the exemplary embodiment, in the image reading chip 415, the second capacitance 115 is configured by the first wire W1 and the second wire W2 provided in the same wiring layer, and thus can be realized in a process included in a general semiconductor manufacturing process. Thus, an additional process is not required, and an increase of cost is not required.

According to the scanner unit (image reading apparatus) 3 of the exemplary embodiment, in the image reading chip 415, the second capacitance 115 is configured as capacitance between the first comb-tooth shaped portion W1a provided in the first wire W1 and the second comb-tooth shaped portion W2a provided in the second wire W2. Thus, it is possible to realize the second capacitance 115 with a small area. Thus, the second capacitance 115 is easily disposed so as to overlap a region in which various elements such as a MOS transistor or a resistor are formed, and it is very effective in reducing the size of the image reading chip 415.

According to the scanner unit (image reading apparatus) 3 of the exemplary embodiment, in the image reading chip 415, the capacitance value $C_c$ of the second capacitance 115 is set to be substantially equal to (desirably, set to be equal to) the capacitance value $C_{gs}$ of the gate-source capacitance 116 of the switch element 113. Thus, the charges accumulated in the gate-source capacitance 116 are substantially completely cancelled with the charges accumulated in the second capacitance 115. Thus, according to the scanner unit (image reading apparatus) 3 of the exemplary embodiment, narrowing the dynamic range of the output signal of the image reading chip 415 due to charge injection hardly occurs, and it is possible to ensure a wide dynamic range. Thus, it is possible to read an image with high sensitivity.

In the exemplary embodiment, as illustrated in FIG. 11, in the amplification unit 112, the NMOS transistor MN1 and the NMOS transistor MN2 are cascode-connected. Even though the NMOS transistor MN2 is not provided, the amplification unit 112 functions as an inverting amplifier. However, in this case, parasitic capacitance between the gate and the drain of the NMOS transistor MN1 is capacitance between the input terminal IN and the output terminal OUT. That is, since the parasitic capacitance is parallel to the first capacitance 114, the capacitance value of the feedback capacitance is more than $C_f$ by the capacitance value of the parasitic capacitance, and the sensitivity is deteriorated. On the contrary, in the exemplary embodiment, since the NMOS transistor MN1 and the NMOS transistor MN2 are cascode-connected, the parasitic capacitance between the gate and the drain of the NMOS transistor MN1 and the parasitic capacitance between gate and the drain of the NMOS transistor MN2 are also not capacitance between the input terminal IN and the output terminal OUT. Thus, regardless of the parasitic capacitance, the capacitance value of the feedback capacitance is capacitance value $C_f$ of the first capacitance 114, and thus it is possible to suppress deterioration of the sensitivity due to the parasitic capacitance.

Further, the amplification unit 112 illustrated in FIG. 11 can increase the voltage amplification rate G to be equal to or more than 1000 times, and accuracy of the approximation expression of Expression (5) is improved as the voltage amplification rate G is increased. Thus, it is possible to improve linearity of the output voltage Vs of the pixel circuit 110, and to reduce variation of the sensitivity in each of the pixel circuit 110.

7. Modification Example

The first wire W1 and the second wire W2 constituting the second capacitance 115 are not limited to the configuration in FIG. 15, and may be set to be various configurations.

Figure 16:
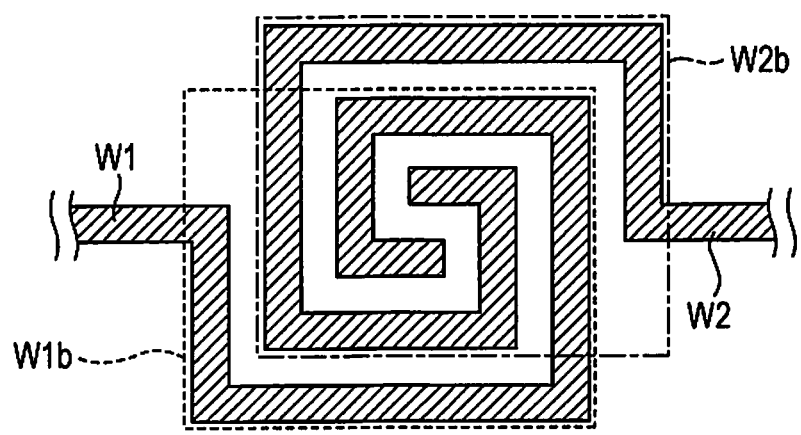
FIG. 16 is a diagram illustrating another example of the first wire and the second wire constituting second capacitance.

FIG. 16 is a diagram illustrating another example of the first wire W1 and the second wire W2 constituting second capacitance 115. Similar to FIG. 15, FIG. 16 illustrates only a portion constituting the second capacitance 115 when the semiconductor substrate of the image reading chip 415 is viewed in plan.

In FIG. 16, the first wire W1 has a first spiral shaped portion W1b, and the second wire W2 has a second spiral shaped portion W2b. First spiral shaped portions W1b and second spiral shaped portions W2b are provided so as to mesh with each other. At this time, the second capacitance 115 corresponds to capacitance between the first spiral shaped portion W1b and the second spiral shaped portion W2b. It is not possible to set a gap between the first spiral shaped portion W1b and the second spiral shaped portion W2b to be smaller than the minimum gap defined in the design rule. However, because an area of portions at which the first spiral shaped portions W1b and the second spiral shaped portions W2b face each other is large, it is possible to realize the capacitance value $C_c$ of about 1 fF with a small area. Further, if wiring having such a small area is provided, it is possible to perform disposition so as to overlap a region in which a MOS transistor is formed when viewed in a plan of the semiconductor substrate, in a metallic layer higher than a polysilicon layer in which the gate of the MOS transistor is formed, and it is possible to reduce the chip size of the image reading chip 415.

Figure 17:
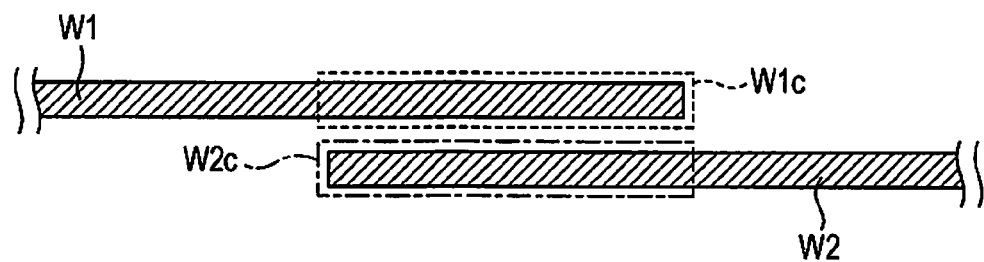
FIG. 17 is a diagram illustrating still another example of the first wire and the second wire constituting the second capacitance.

FIG. 17 is a diagram illustrating still another example of the first wire W1 and the second wire W2 constituting the second capacitance 115. Similar to FIG. 15, FIG. 17 illustrates only a portion constituting the second capacitance 115 when the semiconductor substrate of the image reading chip 415 is viewed in plan.

In FIG. 17, the first wire W1 has a first linearly-shaped portion W1c facing the second wire W2. The second wire W2 has a second linearly-shaped portion W2c facing the first wire W1. At this time, the second capacitance 115 corresponds to capacitance between the first linearly-shaped portion W1c and the second linearly-shaped portion W2c. In FIG. 17, it is not possible to set a gap between the first linearly-shaped portion W1c and the second linearly-shaped portion W2c to be smaller than the minimum gap defined in the design rule. However, an area of portions at which the first linearly-shaped portion W1c and the second linearly-shaped portion W2c face each other is increased, and thus it is possible to realize the capacitance value $C_c$ of about 1 fF with a small area. Fining in the manufacturing process is in progress. If the minimum gap between metallic wires, which is defined in the design rule is reduced more, it is also possible to realize the capacitance value $C_c$ of about 1 fF with a small area.

Figure 18:
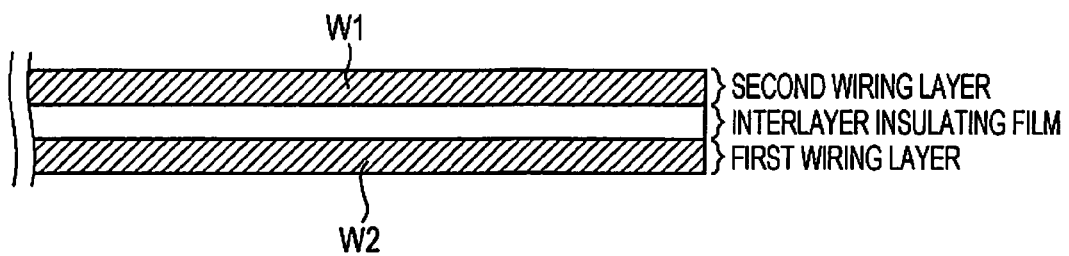
FIG. 18 is a diagram illustrating still another example of the first wire and the second wire constituting the second capacitance.

In the exemplary embodiment and the modification example, the first wire W1 and the second wire W2 constituting the second capacitance 115 are provided in the same wiring layer. However, for example, as illustrated in FIG. 18, the first wire W1 and the second wire W2 may be provided in wiring layers different from each other. In FIG. 18, the first wire W1 is provided in a first wiring layer, and the second wire W2 is provided in a second wiring layer higher than the first wiring layer. The second capacitance 115 is configured by the first wire W1, the second wire W2, and an interlayer insulating film between the first wire W1 and the second wire W2. The second wire W2 may be provided in the first wiring layer, and the first wire W1 may be provided in the second wiring layer higher than the first wiring layer.

Hitherto, the exemplary embodiment or the modification examples are described. However, the invention is not limited to the exemplary embodiment or the modification examples, and may be implemented in various forms in the scope without departing from the gist of the invention. For example, the exemplary embodiment and the modification examples may be appropriately combined.

The invention includes substantially the same configuration (for example, configuration having the same function, the same method, and the same result, or configuration having the same purpose and the same effect) as the configuration described in the exemplary embodiment. The invention includes a configuration obtained by substituting portions which are not essential in the configuration described in the exemplary embodiment. The invention includes a configuration which can have the same advantage as that of the configuration described in the exemplary embodiment, and may achieve the same purpose as that of the configuration. The invention includes a configuration obtained by adding a known technology to the configuration described in the exemplary embodiment.

What is claimed is:

1. An image reading apparatus for reading an image, the apparatus comprising:
   a light receiving element that receives light from the image so as to perform photoelectric conversion;
   an amplifier which is electrically connected to the light receiving element, and amplifies a signal generated by photoelectric conversion;
   a switch element which is electrically connected to both ends of the amplifier so as to be parallel to the amplifier;
   a first capacitance which is electrically connected to both ends of the amplifier so as to be parallel to the amplifier; and
   a second capacitance which has one end which is electrically connected to one end of the light receiving element and one end of the amplifier,
   wherein
   a second signal of which potential is changed after potential of a first signal input to a control terminal of the switch element is changed is applied to another end of the second capacitance.

2. The image reading apparatus according to claim 1, wherein
   the second signal is a signal obtained by reversing a polarity of the first signal.

3. The image reading apparatus according to claim 2, wherein
   the second capacitance is capacitance between a first wire for electrically connecting one end of the light receiving element, one end of the amplifier, one end of the switch element, and one end of the first capacitance, and a second wire on which the second signal is propagated.

4. The image reading apparatus according to claim 3, wherein
   the first wire and the second wire are provided in the same wiring layer among a plurality of wiring layers provided on a semiconductor substrate.

5. The image reading apparatus according to claim 3, wherein
   the first wire has a first comb-tooth shaped portion,
   the second wire has a second comb-tooth shaped portion,
   first comb-tooth shaped portions and second comb-tooth shaped portions are provided so as to mesh with each other, and
   the second capacitance is capacitance between the first comb-tooth shaped portion and the second comb-tooth shaped portion.

6. The image reading apparatus according to claim 1, wherein
   a value of the second capacitance is equal to parasitic capacitance between the control terminal and a terminal of the switch element, which is connected to the one end of the second capacitance.

7. A semiconductor device comprising:
   a light receiving element that receives light so as to perform photoelectric conversion;
   an amplifier which is electrically connected to the light receiving element, and amplifies a signal generated by photoelectric conversion;
   a switch element which is electrically connected to both ends of the amplifier so as to be parallel to the amplifier;
   a first capacitance which is electrically connected to both ends of the amplifier so as to be parallel to the amplifier; and
   a second capacitance which has one end which is electrically connected to one end of the light receiving element and one end of the amplifier,
   wherein
   a second signal of which potential is changed after potential of a first signal input to a control terminal of the switch element is changed is applied to another end of the second capacitance.

* * * * *